United States Patent
Zehnder, II et al.

(10) Patent No.: US 11,156,263 B2
(45) Date of Patent: Oct. 26, 2021

(54) MR MOUNT WITH A DUAL HARDNESS RUBBER DECOUPLER

(71) Applicant: BeijingWest Industries Co., Ltd., Beijing (CN)

(72) Inventors: James William Zehnder, II, Tipp City, OH (US); Timothy Allen Haerr, Enon, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 60 days.

(21) Appl. No.: 16/543,345

(22) Filed: Aug. 16, 2019

(65) Prior Publication Data

US 2020/0080615 A1    Mar. 12, 2020

Related U.S. Application Data

(60) Provisional application No. 62/729,338, filed on Sep. 10, 2018.

(30) Foreign Application Priority Data

Jul. 5, 2019   (CN) .......................... 201910602338.7

(51) Int. Cl.
*F16F 13/00* (2006.01)
*F16F 13/10* (2006.01)
*B60K 5/12* (2006.01)

(52) U.S. Cl.
CPC .......... *F16F 13/106* (2013.01); *B60K 5/1208* (2013.01); *F16F 2224/025* (2013.01)

(58) Field of Classification Search
CPC .......... F16F 13/08; F16F 13/10; F16F 13/105; F16F 13/106

(Continued)

(56) References Cited

U.S. PATENT DOCUMENTS

| 4,664,363 A | 5/1987 | Gold et al. |
| 4,726,573 A * | 2/1988 | Hamaekers ........... F16F 13/106 137/512.15 |

(Continued)

FOREIGN PATENT DOCUMENTS

| CN | 107143596 A | 9/2017 |
| EP | 0042910 A2 | 1/1982 |

(Continued)

OTHER PUBLICATIONS

Extended European Search Report dated Jan. 23, 2020 for counterpart European patent application No. 19194243.2.

(Continued)

*Primary Examiner* — Christopher P Schwartz
(74) *Attorney, Agent, or Firm* — William H. Honaker; Dickinson Wright PLLC

(57) ABSTRACT

A hydraulic mount apparatus includes a housing having an upper and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler attaches to the partition member separating the pumping and the receiving chambers. A moving member of elastomeric material, disposed in the pumping chamber, attaches to the decoupler. The moving member is molded from a first elastomeric material having a first hardness level and a second elastomeric material having a second hardness level with the first hardness level and the second hardness level being different from one another. The second hardness level is less than the first hardness level.

13 Claims, 2 Drawing Sheets

(58) Field of Classification Search
USPC ......... 267/140.11–140.15, 140.2–140.5, 141, 267/141.1–141.7
See application file for complete search history.

(56) References Cited

U.S. PATENT DOCUMENTS

| | | | | |
|---|---|---|---|---|
| 4,783,063 | A | * | 11/1988 | Probst .................... F16F 13/105 267/140.13 |
| 4,889,325 | A | * | 12/1989 | Flower ................... F16F 13/106 267/140.13 |
| 4,907,786 | A | * | 3/1990 | Okazaki ................. F16F 13/106 267/140.13 |
| 5,029,824 | A | * | 7/1991 | LaBeau .................. F16F 13/106 267/140.13 |
| 5,112,032 | A | * | 5/1992 | Klein ..................... F16F 13/105 180/312 |
| 5,263,693 | A | * | 11/1993 | Klein ..................... F16F 13/105 267/140.13 |
| 5,431,377 | A | * | 7/1995 | Klein ...................... F16F 13/18 267/140.13 |
| 6,082,718 | A | | 7/2000 | Yamada et al. |
| 2015/0233443 | A1 | * | 8/2015 | Lemaire ................. F16F 13/10 267/140.14 |
| 2017/0363173 | A1 | | 12/2017 | Schumann |

FOREIGN PATENT DOCUMENTS

| | | |
|---|---|---|
| EP | 0957284 A1 | 11/1999 |
| EP | 1081409 A1 | 3/2001 |
| JP | 2003294081 A1 | 10/2003 |
| JP | 200985252 A | 4/2009 |
| JP | 2017223366 A | 12/2017 |

OTHER PUBLICATIONS

First Office Action and search report dated Jul. 9, 2020 for counterpart Chinese patent application No. 201910602338.7, along with machine EN translation downloaded from EPO.

First Office Action issued for corresponding Japanese Patent Application 2019-162668 dated Jul. 21, 2020.

Second Office Action issued for corresponding Japanese Patent Application 2019-162668 dated Mar. 9, 2021.

* cited by examiner

MR MOUNT WITH A DUAL HARDNESS RUBBER DECOUPLER

CROSS-REFERENCE TO RELATED APPLICATIONS

This application claims the benefit of U.S. Provisional Patent Application Ser. No. 62/729,338, filed on Sep. 10, 2018, and claims priority to China Application No. 201910602338.7, filed Jul. 5, 2019, the entire disclosures of which are hereby incorporated herein by reference.

BACKGROUND OF THE INVENTION

1. Field of the Invention

The present invention generally relates to a hydraulic mount apparatus.

2. Description of the Prior Art

Conventional mounts exist for supporting and providing vibration isolation of vibration sources. One well-known application of these mounts is for supporting components of automotive vehicles. These mounts typically operate to provide engine vibration isolation while also to control the motion of the engine and connected powertrain components with respect to the vehicle frame or body structure. In many applications of engine and powertrain mounts, it is desirable to vary damping characteristics of the mount to provide selective isolation of vibrations at certain frequencies.

One such hydraulic mount apparatus is disclosed in U.S. Pat. No. 6,082,718 which discloses a hydraulic mount apparatus including a housing having an upper portion and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler is attached to the partition member separating the pumping chamber and the receiving chamber. A moving member of elastomeric material disposed in the pumping chamber attached to the decoupler.

Typically, metallic inserts are embedded in the moving member to allow a user to change the stiffness of the moving member. However, the inclusion of the metallic inserts in the moving members increases the manufacturing costs of the hydraulic mount apparatus.

SUMMARY OF THE INVENTION

The present invention eliminates the need for metallic inserts in a moving member of a hydraulic mount apparatus. The present invention also prevents the moving member from extruding into the compression plate under positive pressure and into the cap under vacuum. The present invention further provides a low cost hydraulic mount apparatus having a moving member having different hardness levels using metallic inserts.

It is one aspect of the present invention to provide a hydraulic mount apparatus including a housing having an upper portion and a lower portion disposed on a center axis and defining a housing chamber. A partition member is disposed in the housing chamber dividing the housing chamber into a pumping chamber and a receiving chamber. The pumping chamber extends between the upper portion and the partition member. The receiving chamber extends between the lower portion and the partition member. A decoupler is attached to the partition member separating the pumping chamber and the receiving chamber. A moving member of elastomeric material disposed in the pumping chamber attached to the decoupler. The moving member is molded from a first elastomeric material and a second elastomeric material. The first elastomeric material has a first hardness level and the second elastomeric material has a second hardness level whereby the first hardness level and the second hardness level are different from one another.

It is another aspect of the present invention provide a decoupler for a hydraulic mount apparatus. The decoupler includes a support member disposed on a center axis and extending between a support member upper end and a support member lower end. A moving member of elastomeric material is disposed on the center axis and extends radially outwardly from the center axis to the support member upper end and attached to the support member upper end. The moving member is molded from a first elastomeric material and a second elastomeric material. The first elastomeric material has a first hardness level and the second elastomeric material has a second hardness level whereby the first hardness level and the second hardness level are different from one another.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
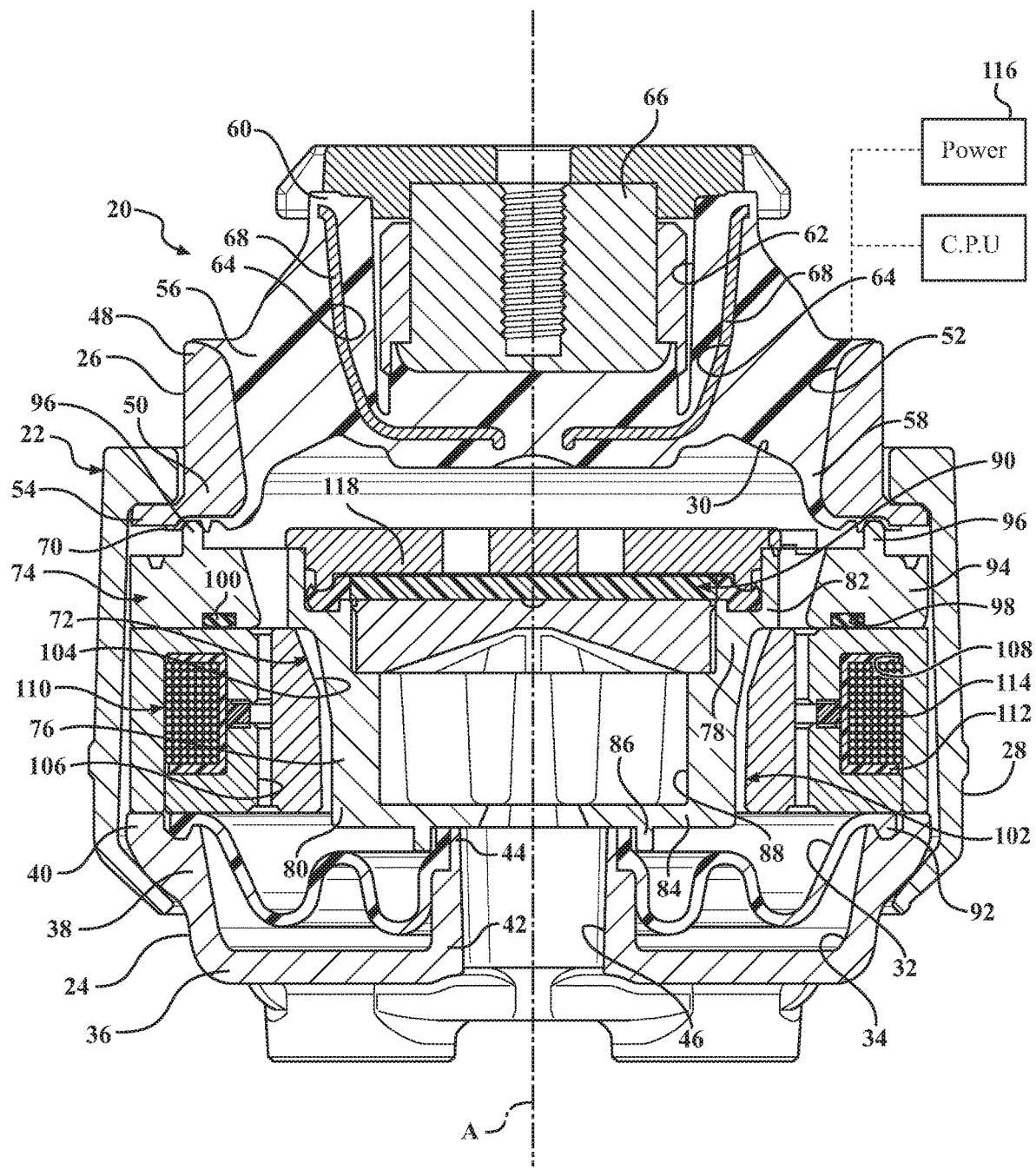
FIG. 1 is a cross-sectional view of the hydraulic mount apparatus in accordance with one embodiment of the present invention.

Referring to the Figures, wherein like numerals indicate corresponding parts throughout the several views, a hydraulic mount apparatus 20 constructed in accordance with one embodiment of the present invention is generally shown in FIG. 1. Typically, the hydraulic mount apparatus 20 is used for supporting a component of a vehicle, e.g. an engine, disposed on a frame of the vehicle. It should be appreciated that the hydraulic mount apparatus 20 can be used for supporting various other vibration sources.

As generally shown in FIG. 1, the hydraulic mount apparatus 20 includes a housing 22 having a lower portion 24 and an upper portion 26. The lower portion 24 and the upper portion 26 are disposed on a center axis A and axially spaced from one another. A wall 28, having a generally tubular shape, is disposed on the center axis A and extends between the lower portion 24 and the upper portion 26 to connect the lower portion 24 with the upper portion 26 and defining a housing chamber 30, 32, 34 extending between the lower portion 24, the upper portion 26, and the wall 28.

The lower portion 24, having a generally bowl shape, extends annularly about the center axis A between a lower portion closed end 36 and a lower portion opened end 38. A lower portion lip 40 extends radially outwardly from the lower portion opened end 38, perpendicular to the center axis A, to engage the wall 28. The lower portion 24 includes a collar 42, having a cylindrical shape, disposed on the center axis A. The collar 42 extends outwardly from the lower portion closed end 36 and annularly about the center axis A to a distal end 44. The collar 42 defines a lower portion bore 46, having a generally cylindrical shape, extending along the center axis A between the lower portion 24 and the distal end 44 for attaching the housing 22 to a vehicle.

The upper portion 26, having a generally tubular shape, is disposed on the center axis A and axially spaced from the lower portion 24. The upper portion 26 extends annularly about the center axis A between a first opened end 48 and a second opened end 50. The upper portion 26 defines an upper portion bore 52, having a generally cylindrical shape, extending along the center axis A between the first opened end 48 and the second opened end 50. The upper portion 26 includes an upper portion lip 54, disposed at the second opened end 50, and extends radially outwardly from the first opened end 48 in a perpendicular relationship with the center axis A to engage the wall 28. It should be appreciated that the upper portion 26 and the lower portion 24 can have other shapes (e.g. square shaped or hexagonal shaped cross sections).

A flexible body 56, made from elastomeric material, is disposed in the upper portion bore 52. The flexible body 56 extends annularly about and axially along the center axis A from a flexible body lower end 58 to a flexible body upper end 60. The flexible body lower end 58 is adjacent to the second opened end 50 of the upper portion 26. The flexible body upper end 60 is adjacent to the first opened end 48 of the upper portion 26 for deforming elastically relative to the lower portion 24 in response to an excitation movement of a vehicle. In other words, the flexible body 56 is attached to the upper portion 26 and deforms in response to an excitation movement of the vehicle, e.g. a vibrational movement. The flexible body 56 defines a flexible chamber 62 disposed adjacent to the flexible body upper end 60 extending axially into the flexible body 56 from the flexible body upper end 60. The flexible body 56 further defines a pair of insert grooves 64 disposed adjacent to and spaced from the flexible chamber 62 extending between the flexible body lower end 58 and the flexible body upper end 60.

A bushing 66, having a generally cylindrical shape, is disposed in the flexible chamber 62 for receiving a fastener to secure the flexible body 56 to the vehicle. A pair of outer inserts 68, made from a metallic material, is disposed in the insert grooves 64 for providing rigidity to the flexible body 56. The flexible body 56 includes a flexible body flange 70 extending radially outwardly from the flexible body lower end 58, in a parallel relationship with the upper portion lip 54, for engagement with the upper portion lip 54 to secure the flexible body 56 to the upper portion 54.

A partition member 72 disposed in the housing chamber 30, 32, 34, between the upper portion 26 and the lower portion 24, and extends annularly about the center axis A. The partitioning member 72 divides the housing chamber 30, 32, 34 into a pumping chamber 30 and a receiving chamber 32, 34. The pumping chamber 30 extends between the flexible body 56 and the partition member 72. The receiving chamber 32, 34 extends between the lower portion 24 and the partition member 72. In one embodiment of the present invention, a magnetorheological fluid can contained in the pumping chamber 30 and the receiving chamber 32, 34. The magnetorheological fluid, as known in the art, is responsive to modify its shear properties. More specifically, in responsive to a magnetic field applied to the magnetorheological fluid, the magnetorheological fluid has the ability to modify its shear property from a free-flowing or a viscous liquid to a semi-solid with controllable yield strength.

Figure 2:
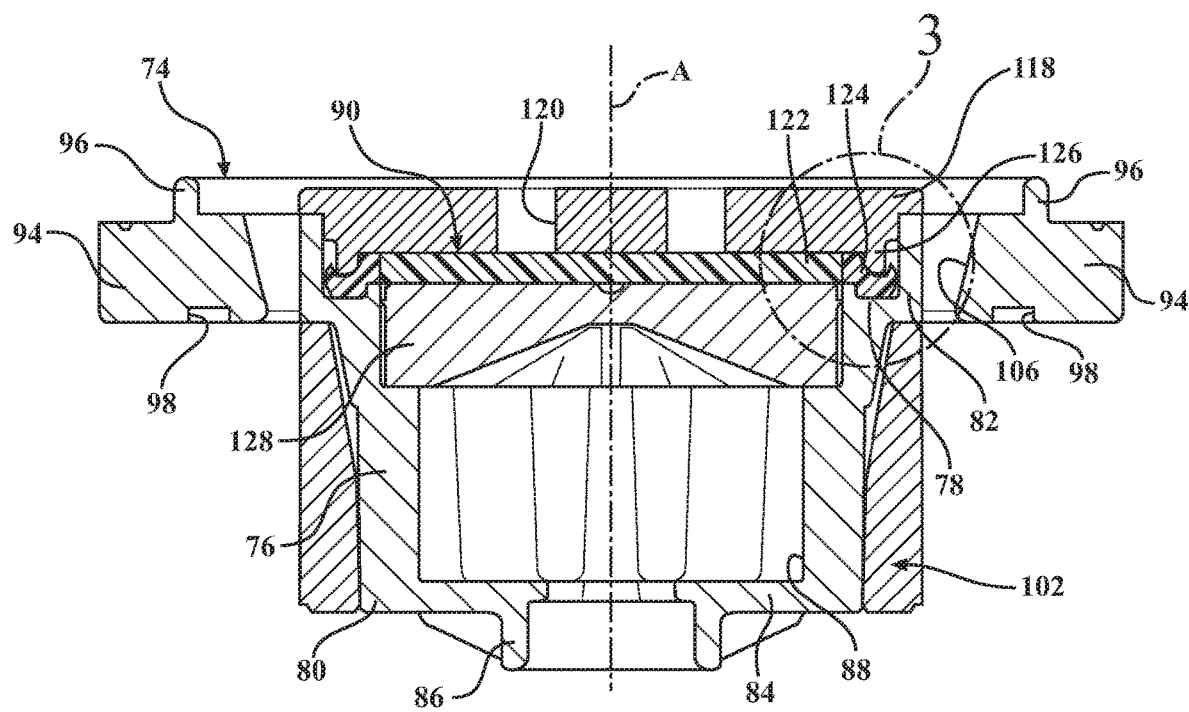
FIG. 2 is an enlarged cross-sectional fragmentary view of the decoupler of the hydraulic mount apparatus of FIG. 1.

As best shown in FIGS. 1 and 2, a decoupler 74 is disposed in the housing chamber 30, 32, 34 and attached to the partition member 72 to separate the pumping chamber 30 and the receiving chamber 32, 34 and to provide additional damping force in the pumping chamber 30. The decoupler 74 includes a support member 76, made from metal and having a generally tubular shape, attached to the partition member 72. The support member 76 extends annularly about and along the center axis A between a support member upper end 78 and a support member lower end 80. The support member upper end 78 is disposed in the pumping chamber 30. The support member lower end 80 is disposed in the receiving chamber 32, 34. A support member upper flange 82 extends radially outwardly from the support member upper end 78 and annularly about the center axis A to engage the partition member 72. A base 84, having a generally circular shape, is attached to the support member lower end 80 defining a recess 88, having a generally cylindrical shape, extending along the center axis A between the base 84, the support member upper end 78, and the support member lower end 80. A support member lower flange 86 extends outwardly from the base 84, along the center axis A, and annularly about the center axis A toward the lower portion to engage the distal end 44 of the collar 42.

The decoupler 74 includes a moving member 90, having a generally circular shape and made from elastomeric material, disposed on the center axis A in the pumping chamber 30. The moving member 90 extends radially outwardly from the center axis A to the support member upper end 78. The decoupler 74 is attached to the support member upper end 78 separating the pumping chamber 30 from the receiving chamber 32, 34. A diaphragm 92, made from an elastomeric material, is disposed in the receiving chamber 32, 34. The diaphragm 92 extends annularly about the center axis A between the lower portion opened end 38 and the distal end 44 of the collar 42. The diaphragm 92 is sandwiched between the lower portion 24 and the partition member 72 and the support member lower flange 86 and the distal end 44 of the collar 42 dividing the receiving chamber into a fluid chamber 32 and a compensation chamber 34. The fluid chamber 32 extends between the diaphragm 92 and the partition member 72. The compensation chamber 34 extends between the lower portion 24 and the diaphragm 92.

The partition member 72 includes an upper spacer 94, made of metal and having a generally circular shape, disposed in the pumping chamber 30, axially adjacent to and below the upper portion 26, and in engagement with the flexible body flange 70 to sandwich the flexible body flange 70 between the upper portion 26 and the upper spacer 94. The upper spacer 94 includes at least one projection 96 extending outwardly from the upper spacer 94 to engage the flexible body flange 70 for securing the flexible body flange 70 between the upper portion 26 and the upper spacer 94. The upper spacer 94 defines at least one upper spacer groove 98, disposed opposite of the at least one projection 96 and axially spaced from the at least one projection 96, extending annularly about the center axis A along the upper spacer 94. A seal 100, made from an elastomeric material, is disposed in the upper spacer groove 98 and extends annularly about the center axis A.

The partition member 72 includes an electromagnetic support ring 102, having a generally circular shape disposed in said fluid chamber 32 between the upper spacer 94 and the lower portion 24. The electromagnetic support ring 102 extends annularly about the center axis A to sandwich the diaphragm 92 between the electromagnetic support ring 102 and the lower portion 24. The electromagnetic support ring 102 also sandwiches the seal 100 between the electromagnetic support ring 102 and the upper spacer 94. The electromagnetic support ring 102 defines a concavity 104, at least one channel 106, and an electromagnetic groove 108. The concavity 104, having a generally cylindrical shape, extends along the center axis A to receive the decoupler 74. The at least one channel 106, radially spaced from the concavity 104 and the decoupler 74, extends through the electromagnetic support ring 102 parallel to the center axis A to allow fluid communication between the pumping chamber 30 and the fluid chamber 32. The electromagnetic groove 108, disposed adjacent to the wall 28 and radially spaced from the at least one channel 106, extends annularly about the center axis A. An electromagnetic field generator 110 is disposed in the electromagnetic groove 108. The electromagnetic field generator 110 includes a bobbin 112, having a generally spool shape, disposed in the electromagnetic groove 108 and extending annularly about the center axis A. At least one coil 114 is annularly wrapped around the bobbin 112 and is electrically connected to a power source 116 for selectively generating a magnetic flux.

A cap 118, having a generally circular shape, is disposed in the pumping chamber 30, adjacent to the support member upper flange 82 and spaced from the decoupler 74, to secure the moving member 90 between the cap 118 and the support member 76. The cap 118 defines at least one orifice 120 extending through the cap 118 for allowing the magnetorheological fluid to flow through the cap 118. It should be appreciated that the at least one orifice 120 can include a plurality of orifices 118, radially and circumferentially spaced from one another, to allow the magnetorheological fluid to flow through the cap 118.

Figure 3:
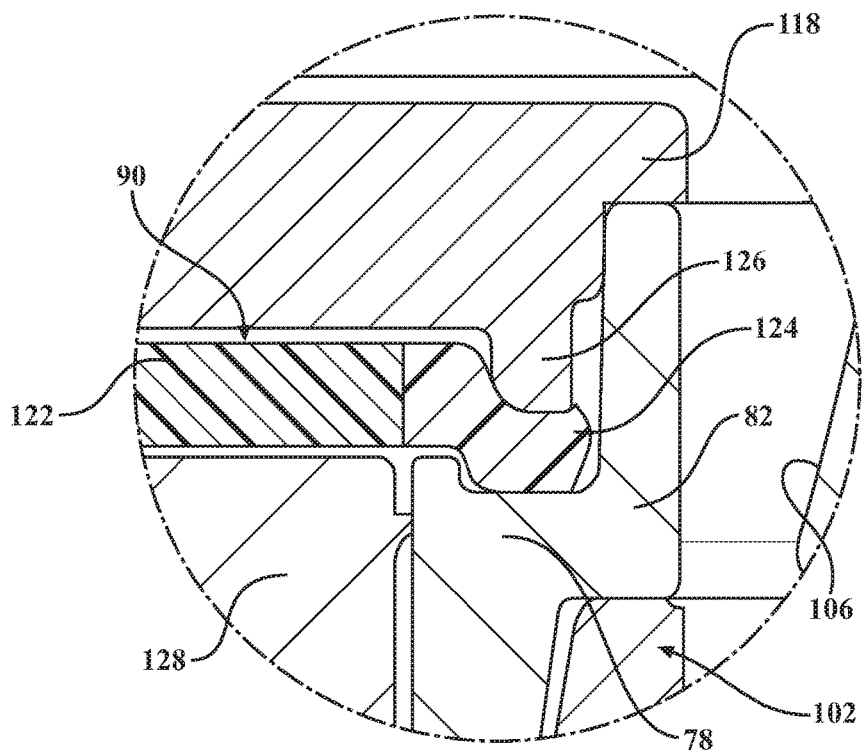
FIG. 3 is an enlarged cross-sectional fragmentary view of the decoupler of the hydraulic mount apparatus of FIG. 2.

As best illustrated in FIG. 3, the moving member 90 is molded from a first elastomeric material and a second elastomeric material. The first elastomeric material has a first hardness level and the second elastomeric material has a second hardness level wherein the first hardness level and the second hardness level are different from one another. It should be appreciated, in one embodiment of the present invention, the second hardness level is less than the first hardness level. The moving member 90, having a generally circular shape, includes an inner portion 122 and an outer portion 124. The inner portion 122 is disposed on the center axis A and is made from the first elastomeric material having the first hardness level. The outer portion 124 is made from the second elastomeric material having the second hardness level and extends about the inner portion 122. For example, it should be appreciated that the outer portion 124 can be made from a soft elastomeric material, e.g. a soft rubber, and the inner portion 122 can be made from a hard elastomeric material, e.g. a hard rubber. By molding the moving member 90 from the first elastomeric material and the second elastomeric material, it provides a low cost alternative to forming the moving member 90 having different hardness levels using metallic inserts. For instance, instead of adding the metallic inserts into the mold to form the moving member 90, the moving member 90 can be formed just by molding the first elastomeric material and the second elastomeric material. This also reduces material cost as well as labor cost.

The cap 118 includes a protrusion 126 extending outwardly from the cap 118 toward the support member upper flange 82 of the decoupler 74 to engage the outer portion 124 of the moving member 90 to secure the outer portion 124 of the moving member 90 between the cap 118 and the support member upper flange 82 of the decoupler 74. It should be appreciated that the protrusion 126 can extend annularly about the center axis A to sandwich the outer portion 124 of the moving member 90 between the cap 118 and the decoupler 74. A compression plate 128, having a generally circular shape and made from a plastic material, is disposed in the recess 88 adjacent and spaced from the moving member 90 for limiting the movement of the moving member 90. As best shown in FIG. 3, only the outer portion 124 of the moving member 90 is secured between the protrusion 126 and the decoupler 74. Due to the outer portion 124 being made form a softer elastomeric material, this allows the inner portion 122, made from a harder elastomeric material, to move/pivot relative to the outer portion 124 when the moving member 90 is subjected to a volume change in the pumping chamber 30. In other words, the outer portion 124 being secured by the decoupler 74 and the protrusion 126 provides a hinge action which allows the inner portion 122 to move relative to the outer portion 124 in response to an external excitation/vibrational movement of the vehicle. In addition, due to the outer portion 124 being made form a softer elastomeric material, this feature allows the moving member 90 to be properly secured between the cap 118 and the decoupler 74 thereby prevents the moving member 90 from extruding into the compression plate 128 under positive pressure and into the cap 118 under vacuum.

In operation, as the hydraulic mount apparatus 90 receives an excitation movement, e.g. a vibrational movement, the flexible body 56 deforms thereby causing a change in the volumes of the pumping chamber 30, the fluid chamber 32, and the compensation chamber 34. As a result, the moving member 90 flexes in the pumping chamber 30 in response to the volume change. As the moving member 90 flexes in the pumping chamber 30, the moving member 90 provides an additional damping force in the pump chamber 30 in response to the excitation movement. As the moving member 90 is flexing in the pumping chamber 30, the outer portion 124 is secured between the cap 118 and the decoupler 74 while the inner portion 122 is moving relative to the outer portion 124 to provide the additional damping force. To further change the rate of damping of the hydraulic mount apparatus 20, the power source 116 can supply power to the coils 114 disposed in the electromagnetic support ring 102 to generate an electromagnetic field. In response, to the electromagnetic field generated by the coils 114, the viscosity of the magnetorheological fluid disposed in the pumping chamber 30 and the fluid chamber 32 changes, e.g. increases, thereby changing rate of damping of the hydraulic mount apparatus 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A hydraulic mount apparatus comprising:
a housing having an upper portion and a lower portion disposed on a center axis and defining a housing chamber;
a partition member disposed in said housing chamber dividing said housing chamber into a pumping chamber and a receiving chamber with said pumping chamber being between said upper portion and said partition member and said receiving chamber being between said lower portion and said partition member;
a decoupler attached to said partition member separating said pumping chamber and said receiving chamber; and
a moving member of elastomeric material disposed in said pumping chamber attached to said decoupler;
wherein said moving member is molded from a first elastomeric material and a second elastomeric material with said first elastomeric material having a first hardness level and said second elastomeric material having a second hardness level whereby said first hardness level and said second hardness level are different from one another,
wherein said second hardness level is less than said first hardness level,
wherein said moving member has a circular shape disposed on said center axis and includes an inner portion and an outer portion with said inner portion being disposed on said center axis and said outer portion extending about said inner portion,
wherein the hydraulic mount apparatus further includes a cap disposed in said pumping chamber adjacent and spaced from said decoupler to secure said moving member between said cap and said decoupler, wherein said cap includes a protrusion extending outwardly from said cap toward said decoupler to engage said outer portion of said moving member to secure said outer portion of said moving member between said cap and said decoupler whereby said second hardness level of said outer portion allows for a hinge action in response to said moving member being subjected to a volume change.

2. The hydraulic mount apparatus as set forth in claim 1, wherein the decoupler includes a support member disposed on a center axis and extending between a support member upper end and a support member lower end.

3. The hydraulic mount apparatus as set forth in claim 2, wherein said moving member extends radially outwardly from said center axis to said support member upper end and attached to said support member upper end.

4. The hydraulic mount apparatus as set forth in claim 3, wherein a support member upper flange extends radially outwardly from said support member upper end and annularly about the center axis A to engage the partition member.

5. The hydraulic mount apparatus as set forth in claim 4, wherein the outer portion of the moving member is secured between the cap and the support member upper flange of the decoupler.

6. The hydraulic mount apparatus as set forth in claim 1 wherein said outer portion is made from said second elastomeric material having said second hardness level and said inner portion is made from said first elastomeric material having said first hardness level.

7. The hydraulic mount apparatus as set forth in claim 1 wherein said decoupler includes a compression plate made from a plastic material disposed adjacent and spaced from said moving member for limiting the movement of said moving member.

8. A decoupler for a hydraulic mount apparatus comprising:
a support member disposed on a center axis and extending between a support member upper end and a support member lower end; and
a moving member of elastomeric material disposed on said center axis and extending radially outwardly from said center axis to said support member upper end and attached to said support member upper end;
wherein said moving member is molded from a first elastomeric material and a second elastomeric material with said first elastomeric material having a first hardness level and said second elastomeric material having a second hardness level whereby said first hardness level and said second hardness level are different from one another,
wherein said second hardness level is less than said first hardness level,
wherein said moving member has a circular shape disposed on said center axis and includes an inner portion and an outer portion with said inner portion being disposed on said center axis and said outer portion extending about said inner portion,
wherein the decoupler further includes a cap disposed adjacent and spaced from said decoupler to secure said moving member between said cap and said decoupler, wherein said cap includes a protrusion extending outwardly from said cap toward said decoupler to engage said outer portion of said moving member to secure said outer portion of said moving member whereby said second hardness level of said outer portion allows for a hinge action in response to said moving member being subjected to a volume change.

9. The decoupler as set forth in claim 8 further including a base disposed on said center axis and connected to said support member lower end to define a recess extending between said support member and said base.

10. The decoupler as set forth in claim 9 wherein said decoupler includes a compression plate made from a plastic material disposed in said recess adjacent and spaced from said moving member for limiting the movement of said moving member.

11. The decoupler as set forth in claim 8, wherein a support member upper flange extends radially outwardly from said support member upper end and annularly about the center axis A.

12. The decoupler as set forth in claim 11, wherein the outer portion of the moving member is secured between the cap and the support member upper flange of the decoupler.

13. The decoupler as set forth in claim 8 wherein said outer portion is made from said second elastomeric material having said second hardness level and said inner portion is made from said first elastomeric material having said first hardness level.

* * * * *